No. 848,822. PATENTED APR. 2, 1907.
G. E. GREENLEAF.
TURRET TOOL POST.
APPLICATION FILED SEPT. 6, 1906.

Witnesses:
Elmer R Shipley.
M. S. Belden.

George E. Greenleaf
Inventor
by James W. See
Attorney

UNITED STATES PATENT OFFICE.

GEORGE E. GREENLEAF, OF PLAINFIELD, NEW JERSEY, ASSIGNOR TO NILES-BEMENT-POND COMPANY, OF JERSEY CITY, NEW JERSEY.

TURRET TOOL-POST.

No. 848,822.      Specification of Letters Patent.      Patented April 2, 1907.

Application filed September 6, 1906. Serial No. 333,529.

*To all whom it may concern:*

Be it known that I, GEORGE EDWARD GREENLEAF, a citizen of the United States, residing at Plainfield, Union county, New Jersey, have invented certain new and useful Improvements in Turret Tool-Posts, of which the following is a specification.

This invention, pertaining to turret tool-posts, will be readily understood from the following description, taken in connection with the accompanying drawings, in which—

Figure 1:
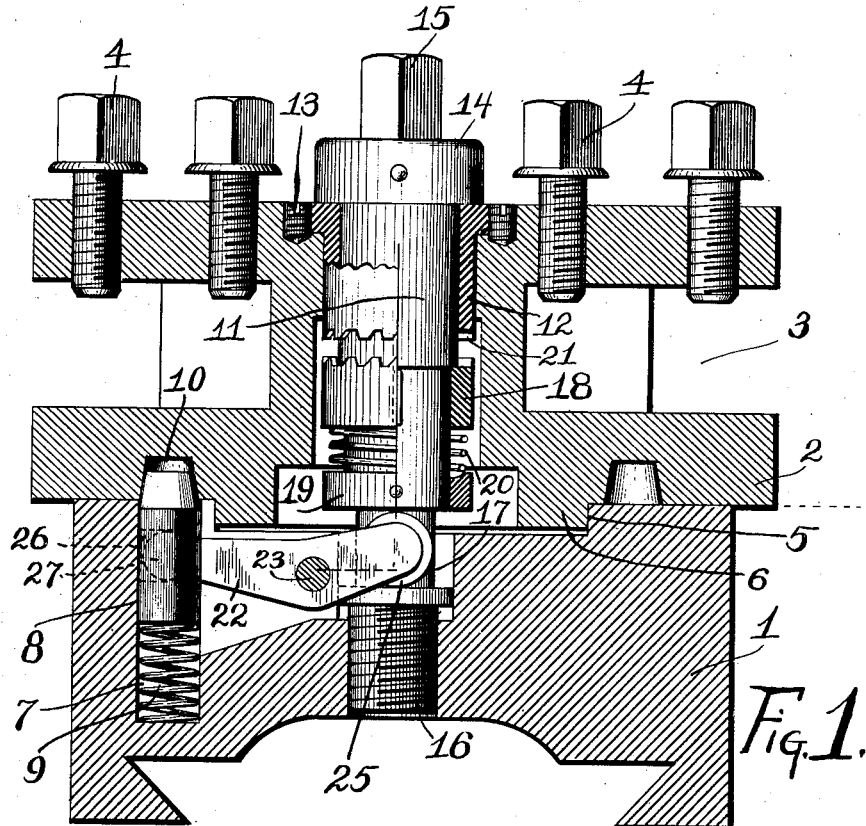
Figure 2:
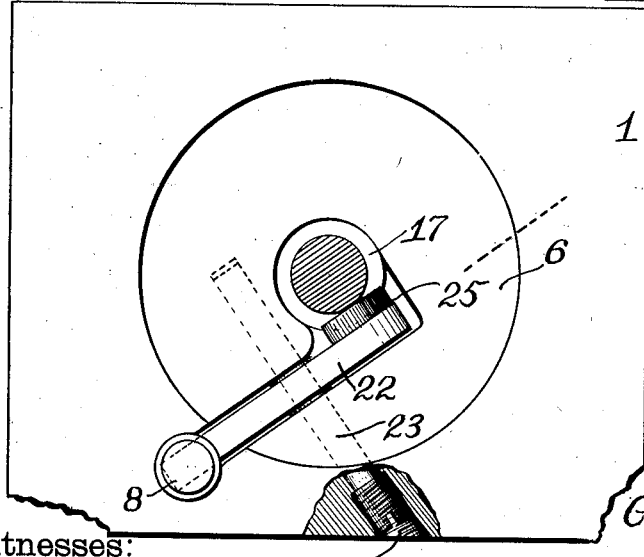

Figure 1 is a vertical section of a turret tool-post exemplifying my invention, and Fig. 2 a plan of the base of the same with the turret removed.

In the drawings, 1 indicates the turret-supporting base to be suited for sliding on a lathe-bed or lathe-carriage, as usual; 2, the turret mounted for rotation thereon on a vertical axis; 3, tool-receiving recesses in the turret; 4, set-screws for clamping the tools; 5, a circular recess in the top of the base; 6, a boss projecting from the turret down into this recess; 7, a vertical lock-bolt recess in the base; 8, a locking-bolt sliding therein; 9, a spring under the locking-bolt urging the locking-bolt upward; 10, an annular series of detent-holes in the base of the turret to be selectively engaged by the locking-bolt; 11, a pintle axially disposed in the turret; 12, a bushing fast in the turret and fitting the pintle; 13, screws for holding the bushing firmly in the turret; 14, a collar fast on the pintle and engaging downwardly upon the turret; 15, a non-circular head to permit the pintle to be turned; 16, the threaded lower end of the pintle screwing into the base-piece; 17, an annular groove in the pintle; 18, a collar splined on the pintle below the bushing 12; 19, a collar fast on the pintle below the collar 18; 20, a spring disposed between collars 18 and 19 and urging collar 18 up against the shoulder on the pintle; 21, ratchet-teeth on the contiguous faces of bushing 12 and collar 18; 22, a lever pivoted in the base-piece; 23, the horizontal pivot of this lever; 24, the outer end of this pivot; 25, a roller on the inner end of lever 22 engaging the annular recess of the pintle; 26, a slot in the locking-bolt, and 27 the outer end lever 22 engaging this slot.

Assuming the parts to be in working condition, with the turret in given position and clamped, as in Fig. 1, let it be assumed that the workman desires to turn the turret to new angular position and there reclamp it and by the use of one of his hands only. He applies a wrench to pintle-head 15, turns it to the left, and thus unclamps the turret from the base. Further turning raises the pintle and depresses and releases the locking-bolt, further turning causes the teeth to engage and virtually lock the pintle to the turret, and further turning motion results in the turning of the turret. The reverse operation leaves the turret standing in its new position, unlocks the ratchet-teeth, lowers the pintle, permits the locking-bolt to go home, and clamps the turret to the base.

The teeth on bushing 12 and collar 18 are ratchet-teeth with such direction of facing that they are active when the pintle is turned in the unscrewing direction; but when the pintle is turned in the screwing direction then spring 20 permits the teeth to disengage and the pintle to turn idly and do its reclamping work while the turret remains in its new position.

It may readily happen that when the ratchet-teeth first meet they will not intermember, their ends striking. In such case spring 20 yields and the teeth will snap into engagement when they come into proper relative position, the spring thus providing against improper relationship of teeth as well as providing for the turning of the pintle in the clamping direction without turning the turret.

I claim as my invention—

1. In a machine-tool, the combination of a base, a rotatable tool-post mounted on the base, a pintle mounted for rotation and longitudinal movement in the tool-post and threaded into the base and having a collar to clamp the tool-post to the base, a series of ratchet-teeth surrounding the pintle and rigid with the tool-post, and a collar mounted on the pintle and having ratchet-teeth to engage the ratchet-teeth carried by the tool-post and adapted to be brought into engagement therewith by the longitudinal movement of the pintle in the tool-post, substantially as described.

2. In a machine-tool, the combination of a base, a rotatable tool-post mounted on the base, a pintle mounted for rotation and longitudinal movement in the tool-post and threaded into the base and having a collar to clamp the tool-post to the base, a series of ratchet-teeth surrounding the pintle and rigid with the tool-post, a collar splined on the pintle and having ratchet-teeth adapted by the longitudinal movement of the pintle to be brought into engagement with the teeth carried by the tool-post, and a spring carried by the pintle and urging said collar in the direction of tooth engagement and against a shoulder formed on the pintle, substantially as described.

3. In a machine-tool, the combination of a base, a rotary tool-post, a rotatable pintle having a screw-thread engaging a threaded socket in the base, an annular guide on the pintle, a plurality of locking sockets in the tool-post, a locking-bolt movable in the base and adapted to engage the sockets, a rock-arm fulcrumed in the base, of which one end engages the bolt and the position of the other is controlled by said guide, a ratchet member carried by the pintle and a ratchet member rigid with the tool-post.

GEORGE E. GREENLEAF.

Witnesses:
  GEO. B. WEAN,
  FRED E. SUBRING.